Patented Nov. 18, 1947

2,430,891

UNITED STATES PATENT OFFICE 2,430,891

TRIS-p-HYDROXYPHENYL ETHYLENES AND PROCESS OF MANUFACTURE

Robert S. Shelton, Mariemont, and Marcus G. Van Campen, Jr., Silverton, Ohio, assignors to The Wm. S. Merrell Company, Reading, Ohio, a corporation of Delaware No Drawing. Application March 21, 1941, Serial No. 384,584

8 Claims. (Cl. 260—613)

This invention relates to new compounds which are of value as estrogenic agents and which combine low toxicity with high therapeutic activity. The new compounds are indicated for the treatment of atrophic rhinitis, amenorrhea, trophic vulvo vaginitis, inhibition of lactation, and in the treatment of the menopause.

The new compounds of the invention are tris-p-hydroxyphenyl ethylene, and certain derivatives thereof, which may be represented by the structural formula:

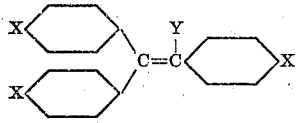

in which X represents a hydroxy, lower alkoxy or acyl-oxy group such as methoxy or ethoxy or acetoxy or propionoxy or other lower alkoxy or acyl-oxy group or in which X represents an amino or alkyl amino group, particularly a dialkyl amino group, or a mercapto or thioalkyl group and Y represents a halogen or hydrogen atom or a carboxyl or hydroxyl group. It is not necessary that all of the X's be the same, for example, one may be a dialkyl amino group while the other two are hydroxy groups or one or two may be acyl-oxy groups, while the other two or one may be hydroxy or alkoxy groups. The compounds in which X represents a hydroxy or alkoxy group and Y represents a halogen seem to have advantages from a therapeutic standpoint, although the acyl-oxy compounds have the advantage of prolonged activity as compared with the alkoxy and hydroxy compounds.

In general, these compounds are well defined crystalline materials, quite soluble in oil and practically insoluble in water. The hydroxy compounds are soluble in aqueous alkali.

As pointed out above, the new compounds are highly active therapeutically, the threshold of estrogenic activity being extremely small. Also, their toxicity is low.

The new compounds of the present invention may be prepared in various ways. The tris-p-methoxyphenyl ethylene, in which X in the foregoing equation is methoxy and Y is hydrogen, is readily prepared by the treatment of p-anisoyl anisole with p-methoxy benzyl magnesium chloride, with subsequent dehydration of the resulting ethanol derivative, or by the reaction of p-methoxyphenyl magnesium bromide with desoxyanisoin or ethyl p-methoxyphenyl acetate, with subsequent dehydration.

From this methoxy compound, the corresponding hydroxy compound is readily prepared by de-etherification with alkali. The halogen derivatives, for example, those in which Y in the foregoing formula is chlorine or bromine, are readily prepared by treating either the methoxy or the hydroxy compound with the desired halogen, for example, in carbon tetrachloride solution.

The compounds in which Y in the foregoing formula is a carboxyl group are readily prepared from the corresponding halogen derivatives by conversion to a Grignard reagent in ether followed by the addition of carbon dioxide and treatment with dilute mineral acid, while the compounds in which Y is a hydroxyl group may be prepared, for example, by reacting anisole with trichloroacetyl chloride and carbon bisulfide in the presence of aluminum chloride, although the yield of the desired product is quite small.

The amino compounds are readily prepared through the use of Grignard solutions prepared from p-halo-anilines and desoxyanisoin, while the thio compounds may be prepared from desoxyanisoin and the Grignard reagents prepared from p-halo-thioanisole.

In general, purification of these products is by conventional methods, involving removal of any solvent used by distillation and purification by recrystallization.

The invention will be further illustrated by the following specific examples, but it is not limited thereto.

*Example 1.*—Preparation of tris-p-methoxyphenyl ethylene. A solution of 24 parts of p-anisoyl anisole in 40 parts of hot benzene is poured with stirring into 160 parts of cold absolute ether. To the resulting suspension of finely divided anisoyl anisole is added 22 parts of p-methoxy benzyl magnesium chloride in about 250 parts of ether. The latter reagent is added with stirring over a period of about one hour, after which the reaction mixture is poured into 150 parts of water containing 37 parts of ammonium chloride and 5 parts of 28% aqueous ammonia. The upper ether layer is separated and evaporated on the steam cone. The residue is recrystallized from hot alcohol containing a little ammonia. Tris-p-methoxy-phenyl ethanol is obtained in about 75–85% yield, M. P. 130–131° C. The ethanol compound is placed in a Claisen flask with a few crystals of sulfamic acid or toluene sulfonic acid and slowly warmed under a pressure of 10 to 20 mm. until effervescence ceases. The residual oil is then poured into 150 to 300 parts of ligroin and warmed until it dissolves. This solution is then treated with decolorizing carbon, and is allowed to stand for several days. Tris - p - methoxyphenyl ethylene separates in white clusters of needle-like crystals, M. P. 100–101° C. The yield is about 85%.

The same product can be readily obtained by reacting p-methoxyphenyl magnesium bromide with desoxyanisoin, or ethyl p-methoxyphenyl acetate, with subsequent dehydration of the ethanol derivative formed.

*Example 2.*—Preparation of tris-p-methoxyphenyl chlorethylene. To a solution of 10 parts of tris-p-methoxyphenyl ethylene in 35–40 parts of carbon tetrachloride is added a solution of 2.0 parts of chlorine in 50 parts of carbon tetrachloride, with stirring, and over a period of one-half hour. The carbon tetrachloride is then removed by distillation on a steam bath and the residual oil is recrystallized from 250–400 parts of methanol, decolorizing with charcoal or the like if necessary. Tris-p-methoxyphenyl chlorethylene is obtained in a yield of 65–75%. It melts at 113–114° C. The corresponding bromine compound is readily prepared by the use of 4.3 parts of bromine in 50 parts of carbon tetrachloride instead of the chlorine solution for the halogenation of the ethylene compound. The bromo compound melts at 119–120.5° C.

*Example 3.*—Preparation of tris-p-hydroxyphenyl ethylene. 10 parts of tris-p-methoxyphenyl ethylene, 40 parts of potassium hydroxide and 70 parts of alcohol are heated in a bomb at 200–220° C. for 36 to 72 hours, after which the mixture is cooled, poured into 200 parts of water and extracted once with ether. The aqueous layer is then strongly acidified with hydrochloric acid, the precipitated crude product is shaken out with ether and is then dried over sodium sulfate and the ether is removed on the steam bath. The residue is crystallized from hot alcohol to give tris-p-hydroxyphenyl ethylene. This product is readily halogenated, as with chlorine or bromine, to produce the corresponding halogen derivatives, using the procedure and conditions described in Example 2.

*Example 4.*—Preparation of tris-p-methoxyphenylacrylic acid. To 5 parts of fine magnesium turnings or powder in 80 parts of dry ether is added to 2 to 3 parts of a solution of ethyl magnesium bromide. The mixture is stirred and a solution of 41.5 parts of tris-p-methoxyphenyl-bromo ethylene in 100 parts of dry ether is added over a period of one hour. While this is added and for about one-half to three-quarters of an hour thereafter, the mixture is gently refluxed. It is then decanted from the unreacted magnesium and poured over 10 to 15 parts of solid carbon dioxide (Dry Ice). When the evolution of carbon dioxide ceases, 50 parts of 10% sulfuric acid are added, the upper ether layer is removed and is twice extracted with 75 parts of 5% caustic soda solution. The aqueous extracts are combined and poured into 25 parts of concentrated hydrochloric acid, the mixture is cooled and the precipitated tris-p-methoxyphenylacrylic acid is filtered off and recrystallized from alcohol. It melts at 202° C.

*Example 5.*—Preparation of alpha,alpha-bis-p-dimethylaminophenyl-beta - p - methoxyphenyl - ethanol. To 26.8 parts of Michler's ketone (4,4'-bisdimethylamino-benzophenone) in 200 to 300 parts of dry benzol is slowly added the Grignard solution prepared from 20 parts of p-methoxybenzyl chloride, 12 parts of magnesium, and 200 to 300 parts of dry ether. This mixture is then poured into 150 parts of a 20% aqueous solution of ammonium chloride made alkaline with ammonia. The upper ether layer is separated and evaporated to a small volume. The residue is then dissolved in warm ether made alkaline with ammonia, chilled thoroughly and the precipitated crystalline product filtered and dried. This product is sufficiently pure for use in the following preparation. It may be further purified by washing with warm ether and recrystallization from alcohol made alkaline with ammonia. When so purified it usually melts with decomposition at 149–151° C.

*Example 6.*—Preparation of alpha,alpha-bis-p-dimethyl - amino phenyl-beta-p-methoxyphenyl ethylene. To 10 parts of the product of Example 5 is added 1 part of thymosulfonic acid. The resulting solid mixture is heated slowly under 20 to 25 mm. pressure until it is completely molten and effervescence ceases. The melt is taken up in 20 to 30 parts of benzol or carbon tetrachloride, and washed with an equal volume of 10% caustic soda. It is then evaporated to near dryness and crystallized from a small amount of ether, yielding alpha,alpha-bis-p-dimethylaminophenyl-beta-p-methoxyphenylethylene, M. P. 125–126° C. The corresponding bromo ethylene or chloro ethylene is readily prepared from it by the procedure described in detail in Example 2.

*Example 7.*—Preparation of alpha,beta-bis-p-methoxyphenyl-alpha-p-meththiophenyl ethylene. To 15.6 parts of desoxyanisoin in 75 to 100 parts of dry ether is slowly added the Grignard solution prepared from 40 parts of p-bromo-thioanisole, 9.6 parts of magnesium and 300 to 500 parts of dry ether. The mixture is then poured into 100–150 parts of 20–25% ammonium chloride solution, separated and the ether evaporated. The residue is twice crystallized from a little alcohol containing a trace of ammonia. It is alpha, beta-bis-p-methoxyphenyl-alpha - p - meththiophenyl ethanol. To 10 parts of this product is added a trace of thymol sulfonic acid after which it is heated under 20–25 mm. pressure until effervescence ceases. The resulting product is then crystallized from ligroin or ether to give the alpha, beta-bis-p-methoxyphenyl-alpha-p-methiophenyl ethylene. Corresponding halogenated compounds may be prepared readily by the procedure described in Example 2.

*Example 8.*—Preparation of tris-p-methoxyphenylvinyl alcohol. 10 parts of anhydrous aluminum chloride are slowly added to a mixture of 5 parts of anisole, 2 parts of trichloroacetyl chloride and 15 parts of carbon bisulfide. The mixture is refluxed for about 8 hours, after which the carbon bisulfide is distilled off and the residue is slowly decomposed with 15 parts of hot water. Tris-p-methoxyphenyl vinyl alcohol is obtained in rather small yields from the oily layer which separates by careful crystallization from methanol.

*Example 9.*—The preparation of acyl-oxy derivatives. To $\frac{1}{10}$ mol of the product of Example 3 is added slightly more than $\frac{2}{10}$ mol of proprionic anhydride and a little pyridine. The mixture is heated for several hours on a steam cone, poured into warm methyl alcohol, filtered if necessary and chilled to precipitate the di-propionate. Other acyl-oxy derivatives, such as those of the products of Example 2 may be similarly prepared as may those in which the acyl-oxy group is a group other than the propio-oxy group. The di-benzoates, for example, are readily prepared in this manner by the use of benzoyl chloride instead of propionic anhydride.

The various compounds included within the invention all possess great estrogenic activity and low toxicity, tris-p-methoxyphenyl bromethylene being particularly active at low dosages. For example, as little as .00000025 gram per gram of body weight may produce full oestrus in ovariectomized white rats.

We claim:
1. Compounds of the formula

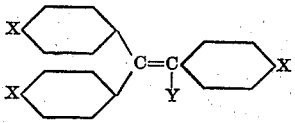

in which each X is a radical selected from the group consisting of hydroxy, alkoxy, and acyl-oxy radicals and Y is a halogen radical.

2. Compounds of the formula

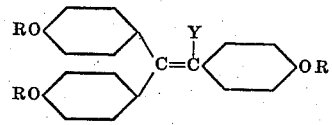

in which R is a lower alkyl and Y is a halogen radical.

3. Tris-p-methoxyphenyl haloethylenes.
4. Tris-p-methoxyphenyl bromethylene.
5. Tris-p-hydroxyphenyl haloethylenes.
6. Tris-p-hydroxyphenyl bromethylene.
7. Process for the manufacture of tri-p-anisyl-bromo-ethylene which comprises causing tri-p-anisyl-ethylene to interact with an approximately equivalent proportion of bromine in presence of an organic solvent.
8. Process for the manufacture of a tris-p-methoxyphenyl haloethylene, which comprises causing tris-p-methoxyphenyl ethylene to interact with an approximately equivalent proportion of a halogen in the presence of an organic solvent.

ROBERT S. SHELTON.
MARCUS G. VAN CAMPEN, Jr.

REFERENCES CITED

The following references are of record in the file of this patent:

UNITED STATES PATENTS

| Number | Name | Date |
|---|---|---|
| 1,732,503 | Dachlauer | Oct. 22, 1929 |
| 2,193,327 | Blass | Mar. 12, 1940 |

OTHER REFERENCES

Smith, "J. Am. Chem. Soc." vol. 53, p. 3076 (1931).